United States Patent [19]

Gangi

[11] Patent Number: 4,624,417
[45] Date of Patent: Nov. 25, 1986

[54] PROCESS FOR CONVERTING SOLID WASTE AND SEWAGE SLUDGE INTO ENERGY SOURCES AND SEPARATE RECYCLABLE BY-PRODUCTS

[75] Inventor: Alfred J. Gangi, Lawrence, Mass.

[73] Assignee: Newest, Inc., Reno, Nev.

[21] Appl. No.: 619,495

[22] Filed: Jun. 11, 1984

Related U.S. Application Data

[63] Continuation-in-part of Ser. No. 505,180, Jun. 17, 1983, abandoned.

[51] Int. Cl.$^4$ .................. B02C 11/08; B02C 21/00; B02C 23/08
[52] U.S. Cl. .................. 241/17; 241/21; 241/23; 241/24; 241/DIG. 38
[58] Field of Search .................. 241/17, 21, 23, 24, 241/DIG. 38; 1/13

[56] References Cited

U.S. PATENT DOCUMENTS 3,716,197  2/1973  Craig et al. .................. 241/DIG. 38

Primary Examiner—Howard N. Goldberg
Assistant Examiner—Timothy V. Eley
Attorney, Agent, or Firm—Pahl, Lorusso & Loud

[57] ABSTRACT

The present invention is an energy efficient process for converting solid waste and/or sewage sludge into a chemical intermediate substrate for production of energy and/or separate non-energy related by-products. The process of this invention integrates technologies for: slurry production and material recovery; slurry demineralization and heavy metal recovery; formation and storage of chemical intermediate substrate; its dewatering; its processing into various energy sources such as solid carbon fuel, steam, or methane gas; and/or production of non-energy by-products such as cement board, gypsum fiber board, or agricultural products.

13 Claims, 10 Drawing Figures

PROCESS FOR CONVERTING SOLID WASTE AND SEWAGE SLUDGE INTO ENERGY SOURCES AND SEPARATE RECYCLABLE BY-PRODUCTS

REFERENCE TO RELATED APPLICATION

This application is a continuation-in-part of U.S. application Ser. No. 505,180, filed June 17, 1983, now abandoned, entitled "Process for Converting Solid Waste and Sewage Sludge Into Fuel".

BACKGROUND OF THE INVENTION

This invention relates to a process for converting solid waste and/or sewage sludge into a chemical intermediate substrate, solid carbon products and other energy sources, and/or separate recyclable by-products.

Nationally, approximately 200 million raw tons of municipal solid waste and approximately 25 million bone dry tons of sewage sludge are generated yearly. Due to chemical contamination, the traditional methods of waste disposal and handling have proven to be technologically unsuited to safe disposal of human and municipal wastes.

Cost-effective and marketable utilization of the intrinsic values of municipal or industrial solid waste components requires that there be both flexibility and reliability in the end use to which derived products may be put.

Efforts to develop a commercially-viable resource recovery market from solid wastes and sewage have been hampered by problems of putrefaction and high levels of impurities in the recovered by-products.

The key to economic recovery of resources is therefore the processing of the input municipal solid waste, sewage sludge and/or industrial solid wastes into clean, uniform non-toxic components: glass, ferrous metals, non-ferrous metals, and a substantially clean, near-homogeneous chemical intermediate substrate from which marketable by-products may be produced in a cost effective manner.

It is accordingly an object of the present invention to provide an efficient, inexpensive process for separately or simultaneously converting solid waste and/or sewage sludge into useful energy sources or non-energy related by-products.

An object of this invention is to provide a modular system which is flexible enough to economically handle large or small quantities of waste.

It is another object of this invention to produce a chemical intermediate substrate, wherein the chemical intermediate substrate is defined as a liquor which may or may not be partially dewatered and which consists of organic solids of a near-homogeneous size distribution and relatively high purity (by resource recovery standards).

It is another object of this invention to provide a process in which separate, non-energy related by-products such as metals and glass of marketable cleanliness standards are easily separated from the chemical intermediate substrate.

It is yet another object of the present invention to provide a process and means whereby the chemical component distribution of the chemical intermediate substrate can be analyzed and adjusted to any consistent chemical energy content desired.

It is another object of this invention to provide a process for destructive distillation of partially dewatered chemical intermediate substrate for production of a clean-burning, storable, high-BTU solid carbon fuel product.

It is yet another object of the present invention to provide a process for direct combustion of partially dewatered chemical intermediate substrate for the production of steam for process applications and/or conversion to electricity.

It is yet another object of this invention to produce methane gas in a landfill by combination of partially dewatered chemical intermediate substrate and microbial innovative buffers.

It is yet another object of this invention to produce soil conditioners, animal feedstocks, fertilizers, or building board from chemical intermediate substrate.

A still further object of the present invention is to produce virtually no unusable residues, thereby eliminating the need for landfill sites.

SUMMARY OF THE INVENTION

The present invention is a process for converting solid waste and/or sewage sludge into a chemical intermediate substrate from which energy sources such as a solid carbon fuel product, methane gas, or steam and separate, non-energy related by-products can be produced. The term "solid waste", as used in this application, includes municipal solid waste, sewage sludge and industrial chemical waste.

Municipal solid waste (MSW) refers generally to the waste generated within a municipality, which can include residential, light commercial or industrial wastes. Typically, municipal solid wastes contain up to 50-80% by weight of combustible materials, such as food, plastics, yard wastes, textiles and papers, and 20-50% by weight of non-combustible materials such as water (approximately 25% by weight), metals (approximately 10% by weight) and glass (approximately 8% by weight).

The composition of municipal solid waste may vary greatly, and will depend mainly on the industrial, commercial and residential mix of the particular geographic location in which the waste is generated. Chemical characterization and blending of waste feedstocks can help optimize the process of this invention.

Sewage sludge (SS), as used in the process of this invention, has been de-gritted and stabilized by methods commonly employed by municipal waste water treatment facilities. Raw sewage sludge typically contains about 65% organic solids by weight. Animal waste sludge may also be used.

Industrial wastes (IW) as used in the process of this invention includes non-chlorinated and chlorinated organic based, industrial chemical wastes.

In the first phase of the process, organic wastes are reduced to an aqueous slurry through a wet shredding process from which organic content and aluminum, glass and steel are separated out. In the second phase, the organic slurry is demineralized and heavy metals removed. In the third phase, the organic slurry is chemically stabilized, stirred and concentrated to form a chemical intermediate substrate. In the fourth phase of the process this substrate is dewatered to the solids content desired.

This organic-based, demineralized, dewatered chemical intermediate substrate pulp may be used to produce energy sources by either destructive distillation into a clean, high-BTU value, solid carbon fuel product, direct combustion to produce steam, or landfilled to produce methane gas. Non-energy related by-products such as cement board, gypsum fiber board, or agricultural products may be produced utilizing the the dewatered chemical intermediate substrate or non-organic byproducts separated out in phase one.

DESCRIPTION OF THE PREFERRED EMBODIMENTS

Figure 1:
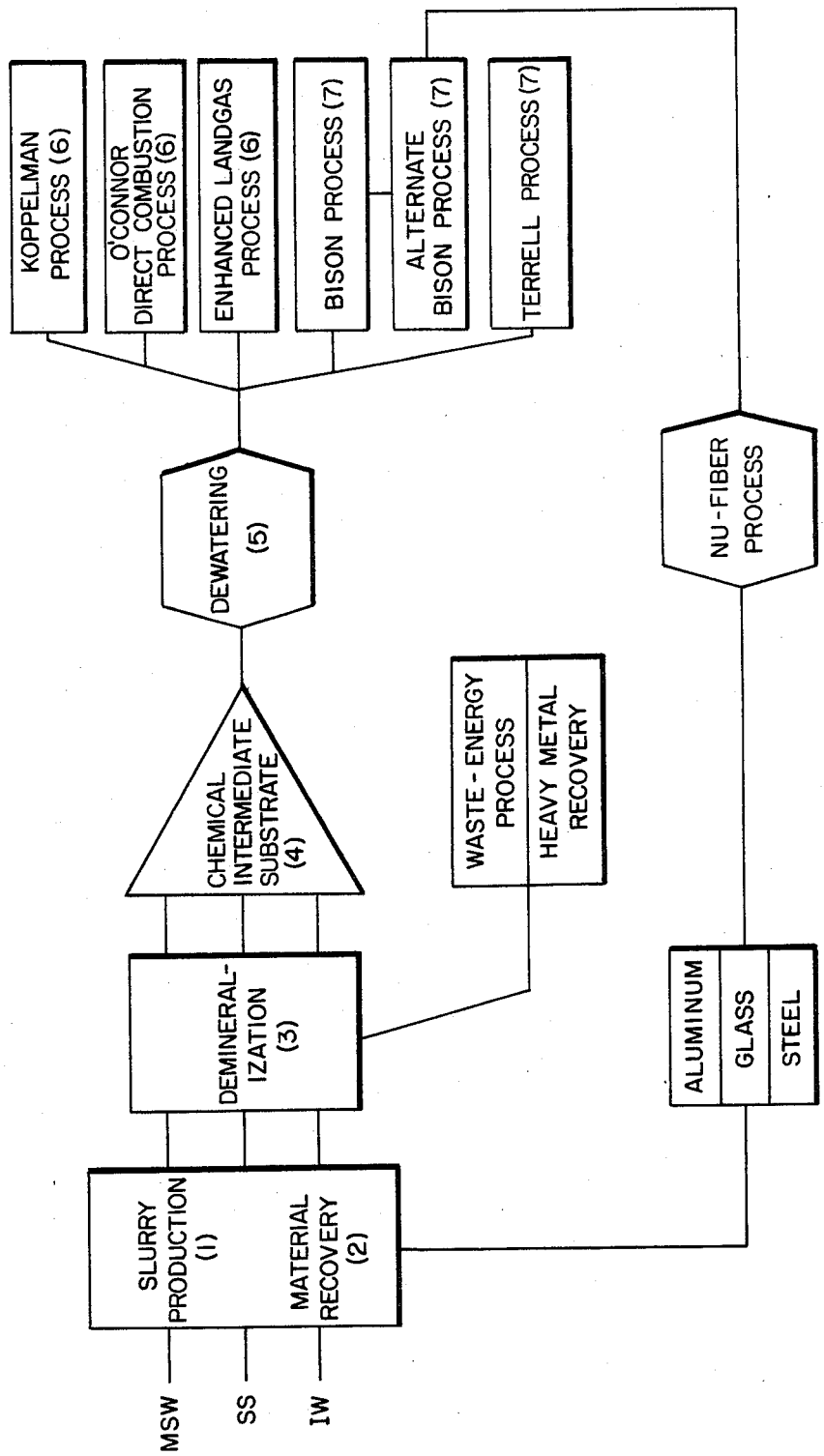
FIG. 1 is a schematic illustrating the components of the waste resource recovery system.

In its broadest overall aspect, the present invention is the integration of multiple process technologies: (1) a process for wet shredding and pulping of solid waste into an aqueous slurry for separation of recyclables (2) a process for separating inorganic materials such as aluminum, glass and steel recovered in step (1); (3) a process for demineralization and detoxification of the pulped material in slurry form; (4) a process for forming a chemically adjustable and stabilized organic material intermediate from the slurry; (5) a process for dewatering of sewage sludge and/or the chemical intermediate substrate; (6) processes for producing sources of energy: a solid carbon fuel product, methane gas, or steam; and (7) processes for producing non-energy related by-products such as cement board, fiber-reinforced gypsum board, fertilizers and soil conditioners. This system is shown schematically in FIG. 1.

The chemical intermediate substrate is a liquor or filter cake (if partially dewatered) containing solids of near-homogeneous size and chemical distribution. It is initially produced in wet-slurry form by controlling residence time within a pulper, until the organic fraction is comminuted to quarter inch size. Size distribution is controlled by the rotor-stator speed, the pumping action and turbulence produced by the rotor stator, and the spacing between rotor and stator.

The pulper concept employed in the present invention is different from other pulpers currently used in wet resource recovery, which permit passage of particles of up to one inch in size.

Smaller comminution means more near-homogeneity of product consistency. For example, a feedstock containing sizeable metal fragments may preclude its application to gypsum or cement board manufacture.

Comminution within the pulper produces a uniquely characteristic size classification for the major categories of materials: organics, ferrous metals, aluminum, non-ferrous metals and glass. The finer size classification thereby achieved admits a more homogeneous organic product and cleaner inorganic products because the small organic size implies a greater wetted area; a lower ash content and consequently higher BTU value of any derived fuel product; and higher quality metals, glass, and other inorganic recovery by-products with consequently higher market value because of the cleanliness (no clinging putrescent substances) and purity of product.

In the first phase of the process of this invention, the waste stream is processed to form an aqueous homogeneous slurry. Separation of the combustible, mostly organic fraction from the slurry is the primary goal of this process phase with recovery of recyclable non-organic by-products as the secondary goal.

Figure 2B:
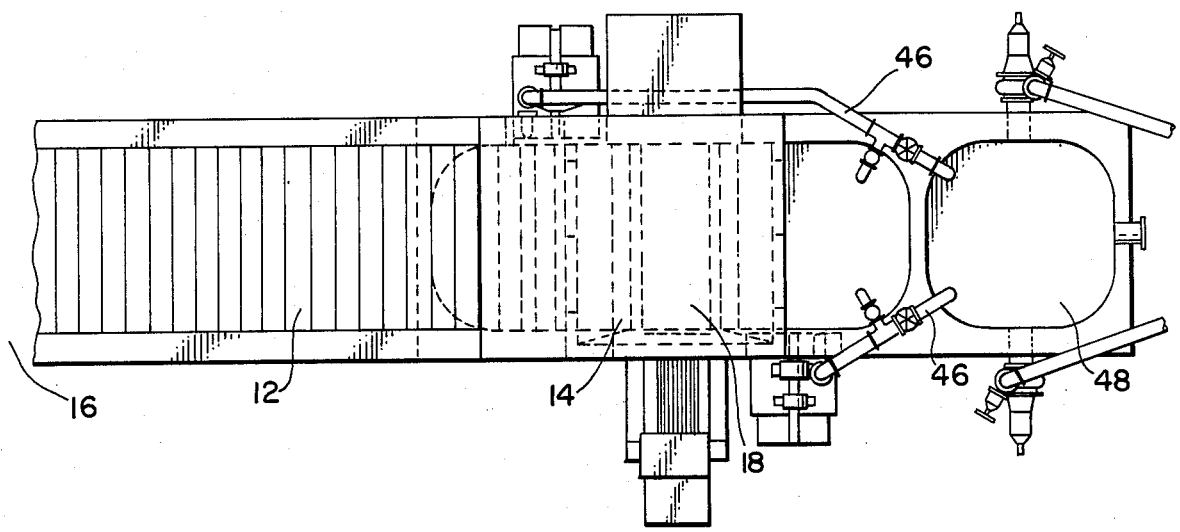
FIG. 2B is a top view of the processing components shown in FIG. 2A.
Figure 2A:
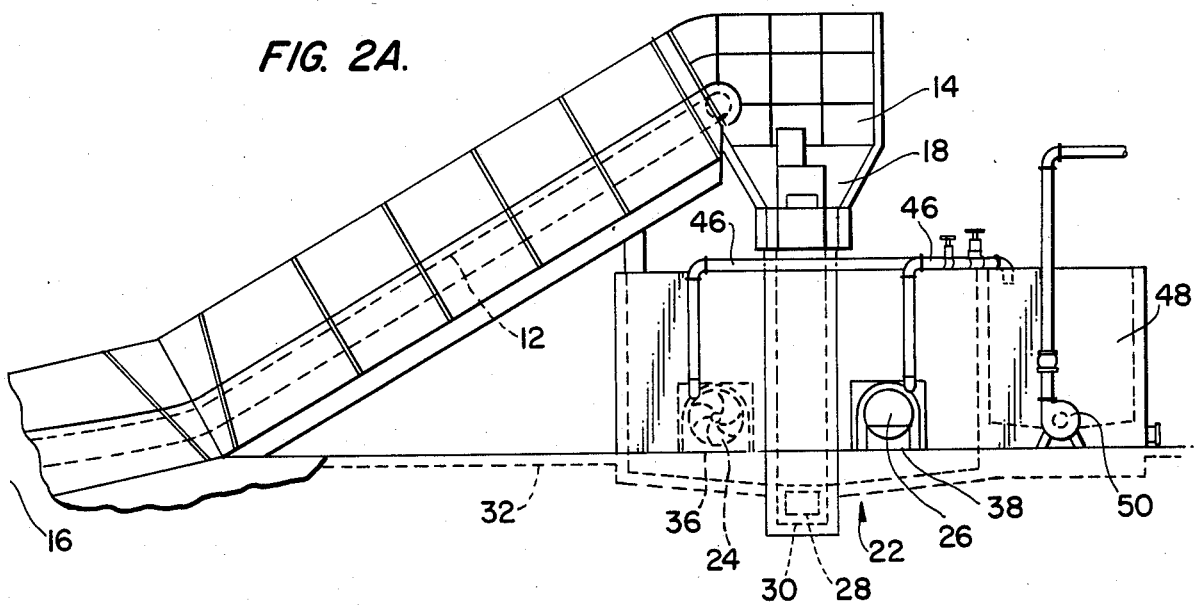
FIG. 2A is a side view of a waste storage pit, a steel belt conveyor to transport waste from the pit to the feed hopper of a shear type shredder, a shredder, two wet pulpers, an accumulator tank for the slurry, and a belt conveyor for transporting metals, large inert materials, and glass to the metal separator shown in FIG. 3.

As is shown in FIGS. 2A and 2B, the solid waste is preferably transported by a conveyor belt 14 from a storage pit 16 into a feed hopper 14 where, while water is being added, a shredder 18 shears the waste into pieces, preferably not larger than 2 inches by 8 inches. Water may be added to the waste during, before or after waste shredding. The water is added to produce an organic slurry consistency suitable for the wet pulpers 24 and 26. Sewage or process water, available from downstream phases of the process, may be used to make the slurry. The shredding stage debulks and lightens the waste material yielding a material with a 5.5% organic fraction solids content. Any type of shredder 18, as commonly used in the industry, may be employed. Consideration must be given to capacity, surge requirements, corrosion resistance, horsepower demand, reliability and cost.

After shredding, the shredded waste flows into a slurry tank 22 of reinforced concrete or steel, preferably located directly below the feed hopper 14 and shredder 18. Vigorous agitation by two pulpers 24 and 26 within the slurry cavity or tank 22 causes large and heavy ferrous metals, large inert materials, and non-ferrous metal pieces to be cleaned and discharged through openings at the bottom of the pulper tank 22 to a junk trap 28 at the bottom of the tank 22 where a moving belt 30 extracts them from the junk trap 28 and deposits them on a vibrating or rotating screen device 32. These materials, plus any large unpulped, organic matter, are continuously washed free of pulped organic material and transported to the rubber belt conveyor 34 shown in FIG. 3.

The organic waste material is reduced to an aqueous slurry by the mixing, blending and cutting actions of a high-speed, rotor/stator located on the sides of the wet pulpers 24 and 26. Mounting cutters on horizontally rotating rotorstators in the wet pulpers 24 and 26 rather than vertically rotating rotor/stator eliminates wear and fiber roping problems usually associated with such pulping application.

Figure 3:
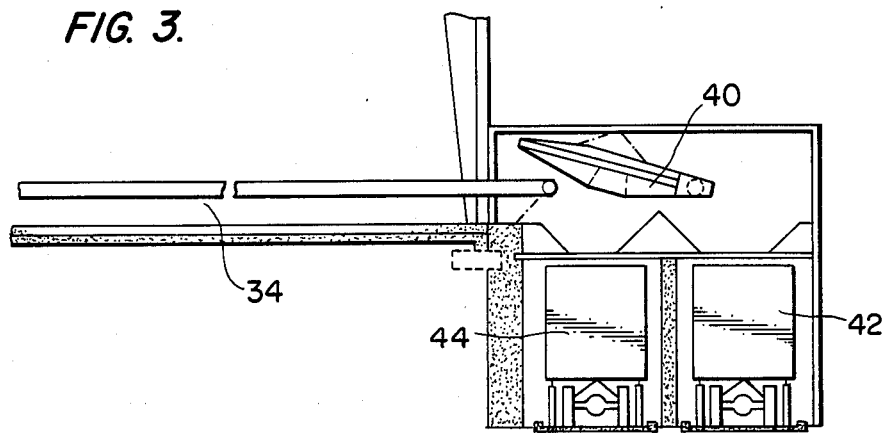
FIG. 3 is a side view of a magnetic belt separator which separates large ferrous metal waste from other waste.

As shown in FIG. 3, magnetic ferrous material is then recovered from the junk trap 22 materials by magnetic separation of non-ferrous and inert materials. Recovery of ferrous metals is preferably based on magnetic attraction of the ferrous metal materials by suspended or pulley type magnets 40. A magnetic separator 40 is positioned over the conveyor belt 34 to attract the ferrous metal materials. The attracted metal is then deposited on another belt, into a drop chute or into a trailer-dumpster 42. The waste materials may be deposited in a different trailer dumpster 44 or sent through the magnetic separator again to recover any ferrous metal that was missed initially. Ferrous metal recovery rates of approximately 90% to 97% are possible using such a system. The recovered ferrous metals are usually reclaimed, washed free of contaminating materials and labels due to the turbulent action of the wet pulper.

The quantity and type of magnets employed is determined by the trap material flow rate, the conveyor belt width, and the characteristics of the solid waste. Permanent magnets or electromagnets may be employed. The magnets may also be equipped with a metal removal system, so that magnetic items will be dropped automatically into a discharge chute for reclamation.

The wet pulp is pumped by conduits 46 from the pulpers 24 and 26 to an accumulator tank 48. From there, the wet pulped slurry is classified into organic and inorganic fractions. The preferred method of classifying the slurry is to pump it through at least one hydrocyclone classifier where the heavier, non-combustible glass and non-ferrous metal fractions are removed by centrifugal action. The light or organic fraction exits at the top and the heavy fraction exits at the bottom. Two stages of wet cyclones are generally used. The first stage cyclone is a high density cleaner and the second stage cyclone is a low density cleaner.

An advantage of the wet pulping is that pulped organic materials are easily separated from non-combustible, recyclable materials and blended into a pumpable, chemical intermediate substrate. Dust and explosion hazards are also eliminated.

Wet pulpers and cyclones are used in the paper industry and are adaptable for this purpose. The quantity of wet pulpers and cyclones to be employed in the process is determined by solid waste stream flowrates, energy requirements, and composition characteristics of the waste.

Figure 4B:
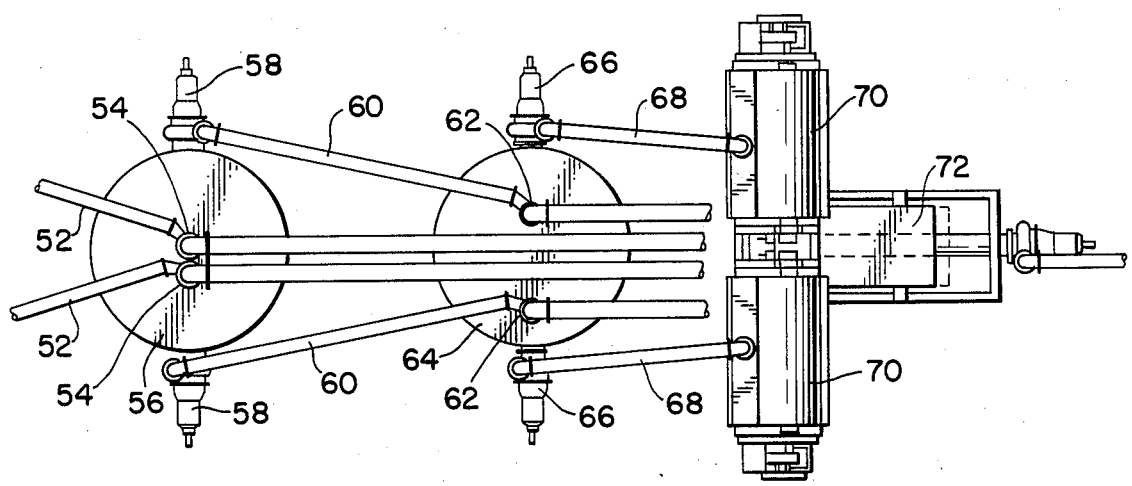
FIG. 4B is a top view of the process components shown in FIG. 4A.
Figure 4A:
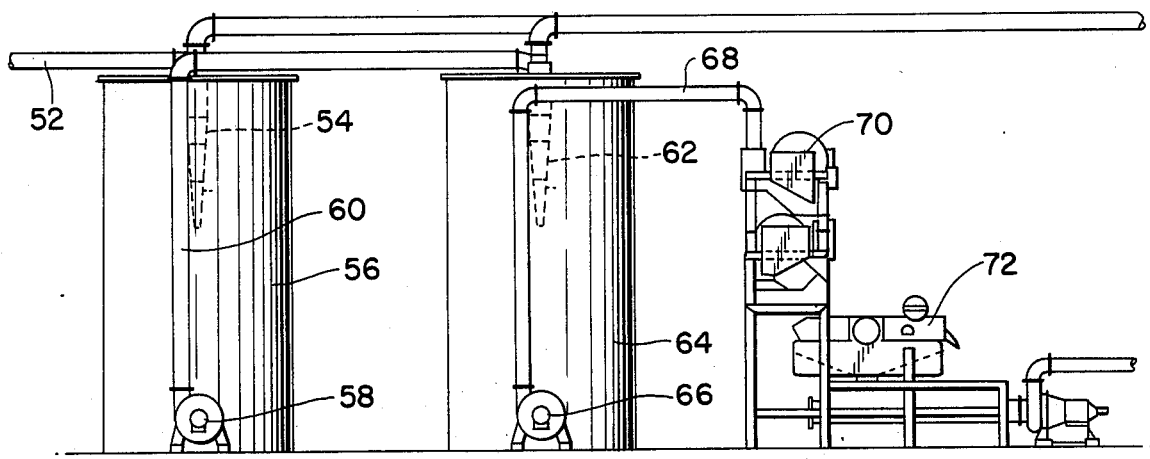
FIG. 4A is a side view of two high density cleaners, two low density cleaners, and collector tanks for separating the organic matter from small ferrous metal, aluminum, glass pieces and inert materials.

The wet slurry may be conveyed by two pumps 50 through conduits 52 directly into each of two high density cleaners 54, mounted on top of a single collector tank 56 as shown in FIGS. 4A and 4B. The optimal parameters of the slurry input into the cleaners selected in this embodiment are: velocity 1200 GPM, organic solids content of 2–4%, and input pressure of 45 psi. Since the high density cleaners 54 cannot separate 100% of the organic phase, a small percentage of organic fraction enters the collector tank 56. Water is added to this material to form a new slurry with less than 1% organic solids content, which is then pumped by two pumps 58 through conduits 60 to each of two low density cleaners 62 mounted on top of a collector tank 64. The low density cleaners 62 operate best when the slurry has an input velocity of 850 GPM, less than 1% organic fraction solids content, and an input pressure of 45 psi.

Metals and glass from municipal solid waste, rejected by the cyclones 54 and 62 and deposited in the collector tanks 56 and 64, are separated by each of two centrifugal pumps 66 pumping a slurry of these materials through a conduit 68 to wet magnetic separators 70. Any ferrous metal fines are removed as an aqueous suspension and the balance of material fed into a vibrating or rotating screen 72 which washes and separates aluminum from glass and inerts by simple mechanical size sifting.

A jigging system may also be employed to separate the metals and glass present in the rejected material. In a jigging operation, water is pulsed through a screen so that lighter material is floated off and the heavier materials are left at the base of the jig. The jigging operation will produce three output streams: (1) a lightweight fraction stream, of which the majority is aluminum can-type material; (2) a medium fraction stream which is mostly glass; and, (3) a heavy fraction stream composed predominantly of cast metals.

Other technologies, such as an Eddy current separator, may be used.

The glass fraction may be further separated from metals using electrostatic separation units. As the material enters an electrostatic field within a rotating drum, the particles become charged, and fall on the drum. Conductors immediately lose their charge on the grounded drum, while nonconductors retain a surface charge and adhere to the drum. The use of an electrostatic separator has proven to be very effective for separating glass materials from conductive contaminants.

The glass stream obtained from the electrostatic separation may be further processed by electronic sorting machines that will optically separate glass according to color using photocells. Those particles within a certain range of reflectivity cause a change in the photocells which in turn triggers a short blast of compressed air to deflect the particle from the main stream.

The lighter, combustible organic fraction resulting from the shredding/pulping/cyclone separation stages may be demineralized at this point, preferably through the use of a heavy metal chelating substrate such as water insoluble cross-linked starch xanthate. The shredding and pulping processes provide maximized surface area, thereby exposing heavy metal cations, mainly attached to fiber surfaces, to the chelating agent where they are removed by contact adsorption. Suitable insoluble cross-linked starch xanthate material is available in granular or pill form from Bioferm International, Medford, N.J.

Figure 5:
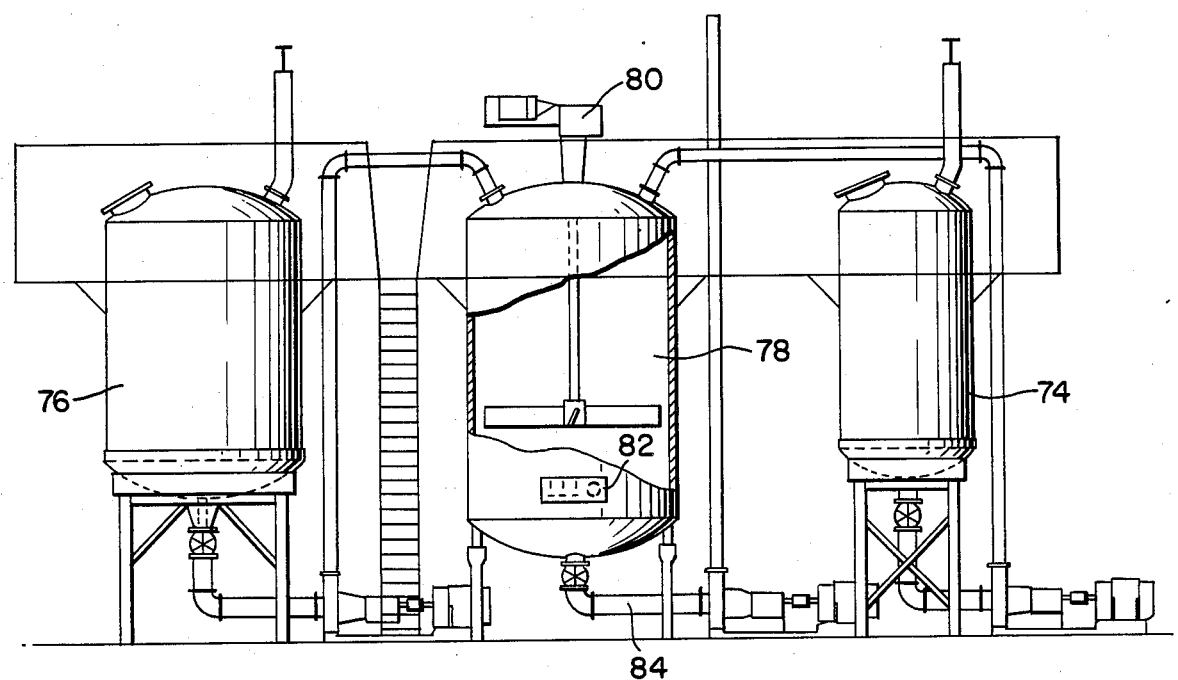
FIG. 5 is a side view of a chelate producing unit consisting of storage tanks and a reaction tank with agitator.

As shown in FIG. 5, ISX-733 xanthate starch may also be manufactured in on site facilities using the process of U.S. Pat. Nos. 4,159,944 and 4,041,182. This process requires a 1000 gallon stainless steel storage tank 74, a 2000 gallon mild steel storage tank 76, and a 2500 gallon jacketed reactor tank 78 with a 25 HP agitator 80 and temperature recorder/controller 82. Chelate formed in the reactor tank 78 is pumped through stainless steel pipes 84 to blending or holding tanks 86, shown in FIGS. 6A and 6B, for blending with and chelation of the wet slurry's organic fraction.

The recovered sludge of accumulated heavy metal ions may be further processed by techniques well known in the art for heavy metal recycling purposes. Demineralization of municipal solid waste can recover substantial quantities of heavy metals.

Demineralization of sewage sludge can also yield substantial quantities of heavy metal ions. All of the ions are not readily accessible, however, since some are trapped within the cell wall of the plant or animal matter. This may be overcome by employing a process which ruptures the cell walls to release the ions into the processing solution for removal. The Erickson et al. process, taught by U.S. Pat. Nos. 4,041,182, 4,159,944, 4,267,049 and 4,342,650, the teachings of which are incorporated herein by reference, is the preferred process. The Erickson et al. process degrades cell structures by mechanical disruption and enzymatic action, using less applied energy than would be required using only the mechanical energy of commercially available colloid mills. The Erickson et al. process also avoids the possibility of explosions which may result from other cell wall destruction processes, such as anaerobic digestion.

Mechanical disruption may be achieved using machines with high speed rotorstator generators to create rotational turbulence, shear and pressure release forces to disintegrate organic particulate matter. Alternative disintegration technologies may be used such as piston-orifice pressure release homogenizer machines or the use of ultrasonic wave energy to dispense solids in slurries, as is well known in the art.

The enzyme hydrolysis reaction can be accomplished in an aqueous slurry, preferably having a 5% to 25% by weight solids content, buffered to a pH value in the range of 6.5 to 7.2, and preferably at a pH of 7.0; and at a temperature range of between 16° C. to 40° C., and preferably at a temperature of about 37° C. The slurry may be recirculated as necessary to keep solids in suspension and accessible to enzymatic reaction. Average time required for the enzyme hydrolysis reaction is in the range of four to ten hours. Treatment facilities can be designed for either batch or flow-through (continuous processing). Processing time should not exceed 12 hours.

The hydrolytic enzymes may be supplied as an aqueous solution of dehydrated non-specific enzymes prepared as a crude mixture separated from bacterial fermentation broths and subsequently dehydrated. Nuclease enzymes should not be present. About 4 pounds of dehydrated enzymes (50,000 International Units of activity per gram dry weight) are required per 10,000 gallons of slurry. Enzymes may be rehydrated in a ratio of 1 pound to five gallons of water, at 37° C., and added into the reactors in the ratio of 1 pound of dehydrated enzymes per 1000 pounds dry weight of organic material.

For large volume installations, a concentrate of about 5 billion viable, hydrolytic enzyme producing microorganisms per gram may be employed. Each pound of this inoculant may be cultured in 50 gallons of water, at about 37° C., to which is added 5% to 7% by volume of beet or cane molasses, or an equivalent source of sugar and minerals, and sufficient urea or an equivalent source of nitrogen to establish approximately a ten-to-one carbon to nitrogen ratio. The pH value is adjusted to the 6.8 to 7.2 range (optimum is 7.0), and air is diffused into the recirculating slurry at the rate of 130 cfm per 1000 gallons. In about 18 to 24 hours, the liquid culture should have a concentration of approximately 1 billion microorganisms per milliliter.

About ninety percent of each batch may be used as inoculant in the enzyme hydrolysis reactor at the rate of about 50 gallons per 1000 gallons of sludge slurry (10% solids by weight). Such cultures should be used within 12 hours of preparation and preferably should be biologically inactivated by preconditioning to disintegrate cellular structure using a mechanical disperser or homogenizer machine as described with reference to the disintegrator step of the present invention. Alternatively, the hydrolytic enzyme inoculant may be introduced and dispersed by addition to the slurry inflow to the disintegrator step of the process.

Ten percent of each batch may be used as the inoculant for subsequent culture batches up to a total of about six such extension cultures, after which a new series of cultures should be started using a fresh supply of dehydrated microorganisms. Useful enzyme-producing microorganisms include those normally found in sewage.

Processed sewage sludge and other filler materials such as wood wastes or peat may be blended with the chelated organic material in the holding tank 86 to obtain the desired carbon concentration and to lower the ash content. Filler materials will depend mainly on availability at the geographic location of the processing plant.

Figure 6B:
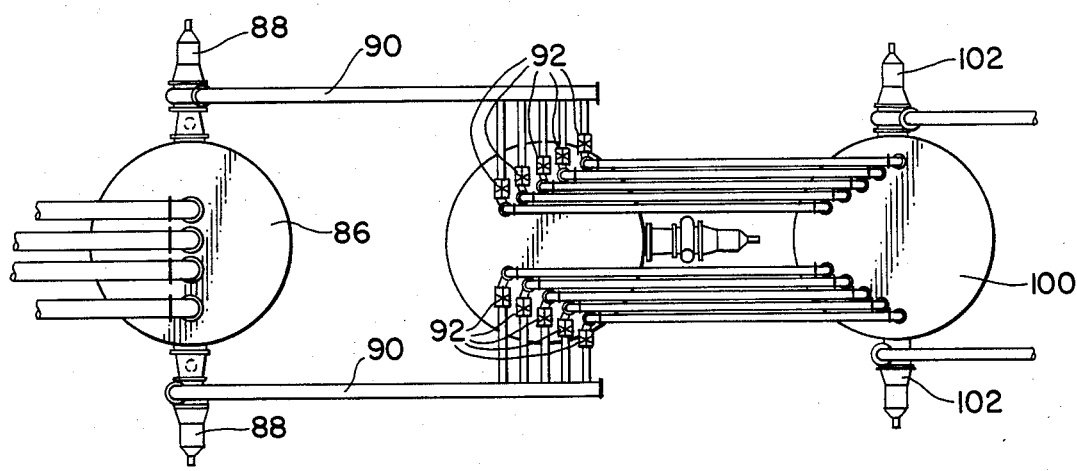
FIG. 6B is a top view of the process components shown in FIG. 6A.
Figure 6A:
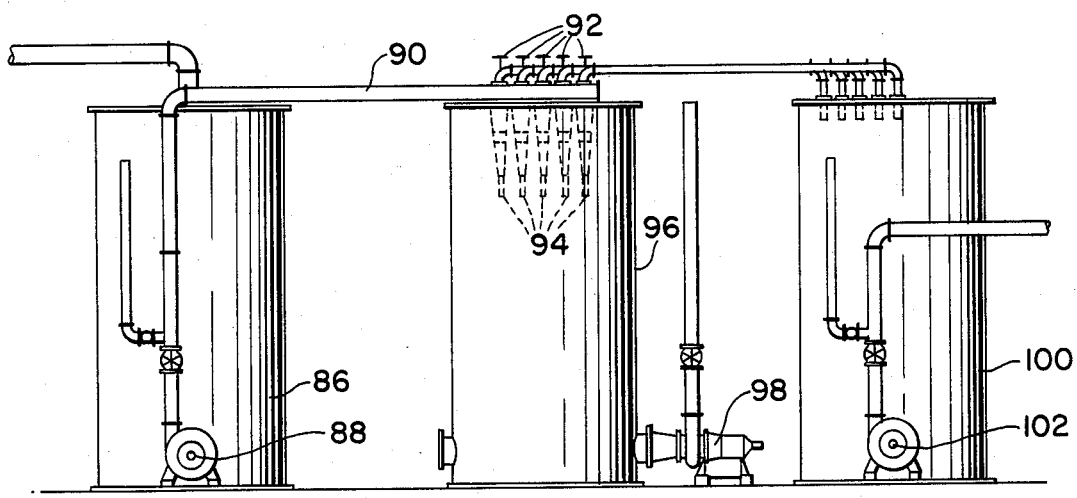
FIG. 6A is a side view of a storage tank for the wet slurry-chelate mixture, two pumps which move it through in-line static mixers to cyclones on a second holding tank, which separate the organic sludge from the chelated heavy metals, sludge and a third holding tank for demineralized organic sludge.

As shown in FIGS. 6A and 6B, the wet slurry-chelate mixture is pumped by two centrifugal pumps 88 through conduits 90 to in-line static mixers 92 for maximum dispersion of the chelate throughout the wet slurry and contact of the chelate with the heavy metal ions. The xanthate starch-heavy metals sludge is separated from the organic fraction by cyclones 94 mounted on top of a second holding tank 96. A bank of five cyclones 94 is required since these units are most efficient at separating slurries with input velocities under 400 GPM, organic solid percentages of less than 1%, and input pressures of 35 psi. A single pump 98 conveys the xanthate starch-heavy metals sludge to salvage or disposal.

The derived organic slurry, the chemical intermediate substrate, is now a near-homogeneous chemical mixture of virtually uniform consistency. The substrate is here analyzed for energy and chemical content. At this juncture, equalization and optimization of energy and chemical content are adjustable by addition of appropriate energy or chemical components on a selective basis.

The chemical intermediate substrate may now be dewatered by conventional means known to the industry. This dewatering serves to provide a controlled process rate for fuel conversion, as by the Koppelman process, or to provide approximately 40-80% solids filter cake which could then be used for direct combustion purposes to produce steam or mixed with anaerobically digested sewage sludge and land filled to make methane.

The dewatering step may be accomplished by dispensing flocculant chemicals into the slurry, followed by mechanical processing using a screw press such as the one disclosed in U.S. Pat. No. 3,939,763 or filter press processing. Reverse osmosis may also be used for dewatering.

Figure 7:
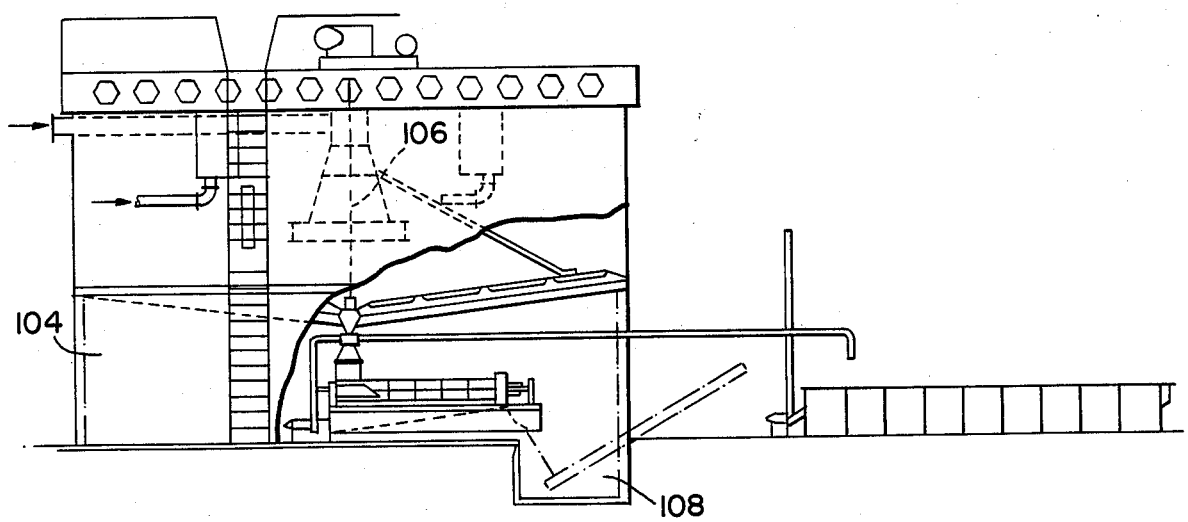
FIG. 7 is a side view of a screw press dewatering and slurry storage unit.

If polymer treatment for dewatering is required, polymer may be added by pumping the slurry from the third holding tank 100, shown in FIGS. 6A and 6B, via two pumps 102 through polymer adding, in-line static mixers on the way to the storage area 104, shown in FIG. 7.

The screw press 106 shown in FIG. 7 removes water from the chemical intermediate substrate, producing a minimum of 25% solid contents for Koppelman processing, 40-80% for direct combustion, or 50% for land gas production. Clarified water is drawn off from the central storage tank 104 and the screw press collecting tank 108, and recirculated back to the beginning of the process, creating the closed loop or water self-sufficient aspect of the process.

The chemical intermediate substrate, formed during phase three of the process by chemical stabilization, storage, and thickening of the demineralized organic slurry, may be further processed to produce energy sources or non-energy related by-products. Examples of such processes for the production of energy sources include the Koppelman process, any direct combustion process, the Terrell process, and the Newest Landgas process.

Production of Energy Sources

A. The Koppelman process. This process, taught by U.S. Pat. Nos. 4,052,168, 4,129,420 and 4,126,519, the teachings of which are incorporated herein, is a patented pyrolitic process for continuous conversion of partially dewatered chemical intermediate substrate slurry into a solid carbon fuel product, K-fuel. K-fuel TM is the registered trademark of Edward Koppelman, the developer and patentee of the process and reactor. The chemical intermediate substrate is chemically decomposed by destructive distillation in a sealed, high-pressure, high temperature chemical reaction vessel. The result is a carbon char and other combustible gaseous hydrocarbons which can be used to self fuel the process. Efficiency of the chemical energy recovery is 65–75%. Actual samples of converted municipal solid waste have tested at 12,997–13,266 BTU/pound, equal to or better than most coals.

Reactor temperatures are in the range of 600°–800° F. with pressures in the range of 50–100 atmospheres. Air is not allowed to enter the reactor and thermodynamic efficiency is increased by vapor flow which is opposite to product in-feed. The reactor is essentially adiabatic, with all necessary heating and cooling going on within the reactor with relatively little outside heat loss.

Waste heat from an external furnace is also recovered by incorporating a flue gas-to-water heat exchanger in the furnace stack. This high pressure 600° F. steam/hot water can then be injected into the reactor at the back end, close to the section where pyrolized solid K-fuel TM is to be discharged. Vaporization of this water cools the solid product to approximately the condensation point of water, thereby further improving thermal efficiency by reducing the temperature of the K-fuel TM product prior to its discharge from the reactor. The counter current flow vapor condenses on the incoming cold material to increase latent energy recovery. The net result is that heat energy initially recovered from the flue gas is recovered in the system in a way which provides both the cooling of the exiting solid product, and pre-heating of the incoming feed material. Alternatively, a portion of the heat from the flue gas recovery system, in the form of high pressure gas, could be used for turbine-generated electrical energy.

K-fuel TM may be discharged from the reactor system as carbon fuel briquettes by continuous compacting product extruders. The solid product temperature at discharge will be dependent on the degree of high pressure steam/hot water injection incorporated, as well as other process control factors. Carbon dioxide, which is produced as a by-product of the process and separated from the methane and other fuel gas components, can be used to cool the K-fuel TM solid product after it has been discharged from the reactor system. In addition to providing solid product cooling, the by-product carbon dioxide can serve as an inert blanket to prevent spontaneous combustion of the hot K-fuel TM. The product is thereby reduced to a temperature of about 200° F.

The Koppelman process and reactor was developed by Edward Koppelman, 4424 Bergamo Dr., Encino, Calif. 91316, with the assistance of SRI International, 333 Ravenwood Ave., Menlo Park, Calif. 94025. The reactor unit is available for processing of chemical intermediate substrate only through NEWEST, 27 Archer St., Lawrence, Mass. 01841.

B. The O'Connor Direct Combustion process. This process, taught by U.S. Pat. No. 3,882,651, the teachings of which is incorporated herein, is a modular system for direct combustion of municipal solid waste into energy to produce steam, hot water or electricity. Adaptation of this process by NEWEST to combust chemical intermediate substrate rather than unprocessed solid waste improves energy yields by 10%, stabilizes combustion and lowers maintenance and ash removal cost.

The O'Connor Combustion process was developed and is marketed by the O'Connor Combustor Corporation, a subsidiary of Westinghouse. The combustor consists of a hollow, water-cooled, steel cylinder made of alternating water tubes and fins welded between the tubes. The cylindrical combustor rotates on a slightly tilted axis at approximately 1/6 RPM. Fins are perforated to admit preheated combustion air. The combustor/boiler system recovers energy in the form of steam.

Under forced draft, all air for combustion is preheated and fed through holes in the fins at velocity sufficient to penetrate the burning material. Processed, partially dewatered, chemical intermediate substrate pulp is introduced into the combustion chamber inlet at the upper end of the combustor by a variable-rate feedstock extruder.

The partially dewatered chemical intermediate substrate first dries, then combusts, as it tumbles down the inclined cylinder of the combustor. 95% of combustible material is incinerated in this manner with remaining combustibles consumed on a special watercooled grate in the boiler where the ash collects. Air passing through holes in the grate penetrates the ash to complete combustion.

Since the present invention uses partially dewatered chemical intermediate substrate introduced directly into the combustor, the fraction of the material recovered as ash from the combustion unit is minimal (less than 5%), and does not require water quenching. Ash disposal is greatly simplified. Since heavy metals have been removed, there is no hazard from release of heavy metals or toxins into the environment.

A closed-circuit, forced circulation system within the combustor generates approximately 30% of the steam. The remaining steam generation takes place in the boiler. Water from the boiler drum is pumped to the combustor's pressurized water circuit, where steam is generated, mixed with circulated water, and returned to the steam drum. This circulation maintains combustor/boiler metal temperature at about 450° F., depending on the pressure.

Steam turbine-driven electrical generators can be used to convert part or all of the thermal energy in the steam generated by the O'Connor Combustors into salable electric power.

C. The Terrell process. This method is disclosed by U.S. Pat. No. 4,335,663, the teachings of which are incorporated herein, for achieving high rates of thermal exchange between solid matter, liquids and hot gases, which also function as the transport medium. By altering reactor operating pressures, temperatures, dwell time and chemical conditions, either a pyrolytic char with coal-like properties, steam or producer gas can be obtained from chemical intermediate substrate. Since the reactor here is a high velocity recirculating and classifying vessel, solid carbon fuel is recovered as a fine powder.

D. NEWEST Landgas process. This process was developed for the controlled operation of landfills to produce an enhanced environment for methane production and for recovery of non-energy byproducts. Use of a homogeneous mix of chemical intermediate substrate and anaerobically digested sewage sludge provides for more rapid methane generation and increased gas recovery than where municipal solid wastes are used to directly fill land, and provides for an earlier return of the land to other uses.

Conventional sanitary landfill operation consists of the disposal of raw solid wastes on the land by spreading the solid wastes in thin layers; compacting them into the smallest practical volume; and applying cover material at the end of each operating day.

Methane gas is produced naturally in sanitary landfills. Its recovery is necessary to prevent the gas from migrating into adjacent residential areas or forming potentially explosive mixtures. To remove the gas, wells are drilled into the landfill and connected together through header pipes to blowers. The gas, a mixture of approximately 50% methane, 50% carbon dioxide with trace amounts of hydrogen sulfide and saturated with water vapor, is then withdrawn from the fill. The water vapor and hydrogen sulfide must be removed prior to utilizing the gas. The remaining gas has a medium BTU heating value of approximately 500 BTU/feet$^3$ and can be used directly as a fuel, converted into electricity or compressed and treated to pipeline quality.

The rate at which methane normally forms in a landfill is dependent upon key factors such as the availability of moisture, availability of nutrients, pH, and temperature. 6.50 cubic feet of methane could theoretically be produced per dry weight pound of solid waste, assuming the solids consist entirely of cellulose.

In actuality, significant reductions in actual methane yield occurs because a portion of the solids contained in the solid wastes are non-degradable or not accessable for degradation, and losses occur through the landfill boundary and in collection systems.

Several U.S. facilities now recover methane from conventional landfills. The first plant for recovering clean gas from a sanitary landfill was built in 1975, by NRG NuFuel (now called Getty-Reserve Synthetic Fuels, Inc.) at the Palos Verdes sanitary landfill in Southern California. Deliveries of gas from this landfill plant currently average 550,000 to 700,000 cubic feet per day.

Conventional landfills, however, are not operated in a manner consistent with improving methane gas production rates or amounts by optimizing environmental conditions. Increases in rate and quantity can be achieved by mixing the chemical intermediate substrate produced from municipal solid wastes with a source of nutrients, such as anaerobically digested sewage sludge, microbial innoculum, and buffer, such as calcium carbonate, prior to placement in the landfill.

In the present invention, enhanced landfill operation uses chemical intermediate substrate, concentrated to 50% organic solids, in specially prepared landfill sites, with leachate and gas collection systems installed over an impermeable barrier, such as a Clay Seal. The liner is sloped in such a manner as to drain leachate into a lined collection pond located at one corner of the landfill.

The key principle behind this concept is that the simultaneous mixing of comminuted solid waste organics, sewage sludge, and buffer will provide an enhanced environment and increased surface area for anaerobic digestion by the microorganisms. The result will be more rapid and complete conversion of the waste into methane gas.

An internal combustion engine or a diesel engine or a gas turbine driven electrical generator can be used onsite to convert all or part of the thermal energy in the extracted methane gas into electric power. Internal combustion and diesel engines are generally used for stations of less than one megawatt capacity. Gas turbines are used for stations of more than one megawatt.

Production of Non-Energy Related By-Products

Examples of processes which utilize the chemical intermediate substrate to produce non-energy related by-products include the Bison process, the alternate Bison process, and the Waste-Energy processes for production of agricultural products.

A. The Bison process is a proprietary process of Bison-Werke, Bahre & Greten GbmH & Co., KG, Springe, Germany, which can convert chemical intermediate substrate into a structural composite board material, cement board, using equal parts of Portland Cement, Wood Fiber and 15-30% partially dewatered chemical intermediate substrate in Bison's continuous board production machinery. Cement board is easily worked, made in a broad range of thickness and size, and non-flammable, termite proof, and fungus and water resistant. Cement Board can be stained with iron oxide or other mineral pigments to impart permanent color or it may be painted with any of the paints compatible with concrete or stucco. A wood grain surface can be attained by using embossed caul plates in the forming process.

In the manufacturing process, the fiber and portland cement are uniformly mixed and the whole mass compressed and cured. The fiber acts as reinforcement giving tensile and shear strength to the product. The portland cement provides great compression strength. Many sources of fiber can be used to manufacture CEMENT BOARD, the only requirement being that nothing associated with the fiber used can interfere with the curing process of the cement. The fiber and the portland cement each contribute to the special qualities of the finished product.

B. The Alternate Bison Process is used to produce another board product using glass recovered during waste processing, fiberized, and mixed with gypsum by Bison continuous board machinery. A strong, fire resistant, lightweight sheetrock type building material is produced.

C. Agricultural Products: Fertilizers, animal feedstocks, soil conditioners, and soil amendments can be manufactured from chemical intermediate substrate. The manufacturing process of Waste=Energy Associates, 100 South Ellsworth Ave., San Mateo, Calif. 94401, produce agricultural fertilizers in liquid or dehydrated form as well as concentrates suitable for foliar feeding; convert agriculture and acquaculture biomass materials into animal feedstock products; and produce concentrates and extracts for biochemical intermediate use as soil conditioners and soil amendments.

Example using the present system for Conversion of municipal solid waste

Municipal solid waste samples, generated from the community's residential, light commercial and hotel/casino districts, were collected from three sectors in Reno and Sparks, Nev. Wastes from each sector were individually characterized and processed so that each sector's contribution to the overall composite could be separately assessed.

Some potentially troublesome large objects were removed initially. The residential sample weighed 263 pounds, and contained paper, grass, paper boards, glass, dirts, metals, plastics and other unknown materials. The commercial sample weighed 252 pounds and contained paper and paper board, tile flooring, glass, wire, plastics, some metals, and other unknown materials. The hotel/casino waste sample weighed 285 pounds, and contained paper wastes, glass, plastics, food wastes, metal and other minor contaminants. All materials are listed in decreasing percent of total.

Each sample was processed through a wet pulper. After extracting each slurry sample, the contents remaining in the pulper were screened and drained into the sewer. A 55 gallon drum of screenings was collected from each sample type. Large metal pieces about the size of a half dollar were found at the bottom of the pulper and also in the drain screenings. Only one amber colored piece of glass was found in either the tank bottom or screenings.

A maximum input of approximately 550 pounds of raw municipal solid waste per every 600 gallons (5000 pounds) of water was possible without adverse effects on the pulper operation.

Each of the three samples was individually processed to separate inorganic and organic materials.

Approximately 400 gallons of the pulped slurry were placed into a holding tank and circulated to provide even particle distribution. The tank contents were screened at a high flow rate using a vibrating screen with a ¼" by ½" open area screen plate to remove large, coarse nonorganic or organic materials which would make further processing difficult. The resulting slurry (screen accepts), with a maximum particle size of ¼", was separated into organic and inorganic fractions by a centrifugal cleaner. The organic phase was then dewatered to approximately 22% solids by weight.

The four process streams: ¼" screen reject material; centrifugal cleaner reject material (inorganic phase); dewatered organic phase; and effluent from the dewatering stage were analyzed.

Before screening and processing, the residential waste sample had an ash content of 45.8% by weight, consisting mainly of sand, diatomaceous earth and glass. 16%–20% by weight of the sample was rejected by the ¼" screen and contained approximately 50% organic material, 50% inorganic materials, and 4% plastic by weight. Of the remaining material, 43% by weight was inorganic material and was rejected by the centrifugal cleaner. The material accepted by the centrifugal cleaner was 7.1% ash by weight, a reduction of 84%.

The commercial or light industrial waste sample had an initial ash content of 24.1% by weight, the lowest of the three samples. The screening process rejected 23%–30% by weight of most organic materials. Of the organic material, approximately 3%–4% by weight (paper flakes, fiber, and plastics) could potentially be returned to the system. The centrifugal cleaner rejected the inorganic phase, 19% by weight of the remaining sample. The final ash content of the organic phase, accepted by the centrifugal cleaner, was 5.8% by weight, a reduction of 75.9%.

The hotel/casino waste sample had an initial ash content of 39.6% by weight. Screening rejected 17.8% by weight of the sample, mostly inorganic materials. The centrifugal cleaner rejected 53% by weight of the remaining material as an inorganic phase. The final ash content of the organic phase, the material accepted by the centrifugal cleaner, was 5.0% by weight, a reduction of 87.4%.

A sample of the material accepted by the centrifugal cleaner was tested for dewatering and clarification process alternatives. A belt press was found to be most effective for dewatering and clarification, after pretreatment of the slurry with a polymer.

A raw composite pulp sample was also pressed in a wire-screen filter to determine the quantity of water that could be removed by pressing. It was found that the dewatered pulp, approximately 22% solids by weight, could be pressed to 35.9% weight solids using 100 psig pressure and to 52.4% weight solids using 1700 psig pressure, the approximate Koppelmann reactor operating pressure.

Table 1 lists weight percentages for materials separated by the centrifugal cleaner.

TABLE 1

| | WASTE CHARACTERIZATION | | | |
|---|---|---|---|---|
| | RESIDENTIAL (WT. %) | COMMERCIAL (WT. %) | HOTEL/CASINO (WT. %) | COMPOSITE (WT. %) |
| WEIGHT RATIO | 32.8 | 43.6 | 23.6 | 100.0 |
| ACCEPTS: | | | | |
| Organics | 51.1 | 67.8 | 44.9 | 56.9 |
| REJECTS: | | | | |
| Lost Organics* | 4.3 | 8.7 | 16.5 | 9.1 |
| Inorganics | 3.3 | 3.6 | 2.4 | 3.2 |
| Aluminum | 2.5 | 0.5 | 3.0 | 1.7 |
| Non-Ferrous | 3.5 | 1.5 | 3.0 | 2.5 |
| Ferrous | 13.7 | 8.2 | 9.7 | 10.4 |
| Glass/Ceramic | 21.6 | 9.7 | 20.5 | 16.2 |

*Values were raised by less than 1.0% to adjust for moisture remaining in the output of the fuel product. All weight percentages were computed on a dry basis.

A 50 ml sample of the effluent from the dewatering stage for each sample was analyzed for solids content. The combined sample results were: 2356 mg total solids/liter, 1922 mg total volatile solids/liter, 100 mg total suspended solids/liter, and 90 mg total volatile suspended solids/liter.

25 pounds of dewatered organic material, approximately 22% solids by weight, from each source were analyzed for heavy metals concentration, processing requirements and possible demineralization levels. A high heavy metal concentration was present in all three waste samples.

Samples were demineralized according to the Erickson et al process using a combination of chelation and ion exchange.

Table 2 lists the heavy metal content of all three waste samples before and after demineralization. A composite heavy metals content and a composite percentage removal of the heavy metals are also listed in Table 2. Higher removal rates would be possible with two or three passes through the demineralization process; results are based on a single pass.

TABLE 3-continued

COMPOSITION AND FUEL VALUE OF PRODUCTS FROM COMPOSITE WASTE PULP

| Ash | 30.45 | 0.34 | 10.72 |
|---|---|---|---|
| Ultimate Analysis (Moisture-Free, wt %) | | | |
| Carbon | 63.15 | 76.23 | 69.70 |
| Hydrogen | 3.47 | 9.39 | 5.63 |
| Sulfur | 0.25 | 0.19 | 0.16 |
| Nitrogen | 1.55 | 1.00 | 1.43 |
| Oxygen | 1.13 | 12.85 | 12.34 |
| Gross Heating Value (BTU/lb) | 10,900 | 15,018 | 12,973 |

Table 4 presents an analysis of the gas produced in

TABLE 2

HEAVY METAL CONTENTS

| WEIGHT RATIO: | RESIDENTIAL SECTOR CONTRIBUTION:32.8% | | COMMERCIAL SECTOR CONTRIBUTION:43.6% | | HOTEL/CASINO SECTOR CONTRIBUTION:23.6% | | COMPOSITE TOTAL 100% | | COMPOSITE % REMOVAL |
|---|---|---|---|---|---|---|---|---|---|
| | UN-TREATED | DEMIN-ERALIZED | UN-TREATED | DEMIN-ERALIZED | UN-TREATED | DEMIN-ERALIZED | UN-TREATED | DEMIN-ERALIZED | |
| Ash (wt. %) | 2.01% | | 2.29% | | 1.38% | | 5.68% | | |
| | (ppm) | (ppm) | (ppm) | (ppm) | (ppm) | (ppm) | (ppm) | (ppm) | |
| Iron (Fe) | 4181.4 | 225.80 | 4468.7 | 214.52 | 2110.3 | 151.94 | 10760.4 | 592.2 | 94.5 |
| Copper (Cu) | 466.6 | 66.73 | 666.1 | 77.21 | 235.1 | 30.1 | 1367.8 | 174.0 | 87.3 |
| Chromium (Cr) | 765.7 | 65.83 | 879.4 | 59.8 | 285.6 | 10.6 | 1921.7 | 136.2 | 92.9 |
| Lead (Pb) | 398.2 | 47.8 | 872.4 | 156.33 | 237.2 | 36.53 | 1507.8 | 240.6 | 84.1 |
| Nickel (Ni) | 465.9 | 47.73 | 687.0 | 54.96 | 265.3 | 21.22 | 1418.2 | 120.9 | 91.5 |
| Tin (Sn) | 330.9 | 22.51 | 494.7 | 40.57 | 220.9 | 19.00 | 1046.5 | 82.1 | 92.2 |
| Molybdenum (Mo) | 38.1 | 5.55 | 41.4 | 6.32 | 17.7 | 2.95 | 97.2 | 14.8 | 84.5 |
| Vanadium (Va) | 107.5 | 7.42 | 174.5 | 9.60 | 68.4 | 5.12 | 350.4 | 22.1 | 93.7 |

A composite 40 pound sample was prepared from dewatered organic material, with approximately 22% solids by weight and an ash content of 4.02% by weight, for determination of process conversion ratios, conversion yields (both quality and quantity), conversion reactor operating parameters and overall process conversion efficiency, using the Koppelman process.

Two runs of the sample were made in the Koppelman reactor to cover a range of possible operating conditions and product characteristics.

One sample was placed in a stainless steel reactor and treated by the Koppelman process using a maximum temperature of 800° F. Condensed liquids and product gases were collected and measured. A quantity of tar was collected in the condenser along with the water for separate analysis.

A second sample was processed in the Koppelman reactor at a maximum temperature of 600° F. This test was designed to prevent the separation of tar from the solid product by increasing the reactor pressure to 1960 psig, equivalent to a pressure of 1500 psig in the continuous Koppelman reactor.

Analyses of the products from both runs are listed in Table 3. The gross heating value of the product as measured by a bomb calorimeter is also shown Table 3.

TABLE 3

COMPOSITION AND FUEL VALUE OF PRODUCTS FROM COMPOSITE WASTE PULP

| Control Temperature, °F. | 800 | 800 | 600 |
|---|---|---|---|
| Fuel Product | Solid | Tar | Solid |
| Moisture, wt % | 0.74 | 3.29 | 1.47 |
| Proximate Analysis (Moisture-Free, wt %) | | | |
| Volatile | 35.86 | 82.95 | 44.87 |
| Fixed Carbon | 33.69 | 16.71 | 44.41 | the 800° F. run. The higher heating value of this gas was calculated to be 140 BTU/SCF, and could potentially be increased to about 930 BTU/SCF by removal of the $CO_2$, the major component.

TABLE 4

COMPOSITION OF GAS PRODUCED FROM COMPOSITE WASTE PULP (CONTROL TEMPERATURE: 800° F., AVERAGE MOLECULAR WEIGHT: 40.9)

| COMPONENT | MOLE % |
|---|---|
| $H_2$ | 3.32 |
| CO | 5.90 |
| $CO_2$ | 84.98 |
| $H_2S$ | 0.11 |
| $C_1$ | 2.47 |
| $C_2$ | 1.19 |
| $C_3$ | 1.02 |
| $C_4$ | 0.52 |
| $C_{4+}$ | 0.49 |

The quantity and energy content of the fuels produced from the composite waste sample are presented in Table 5. The values in Table 5 are based on the feed and product weights obtained in the two tests and the measured heating values of the products. The results have been normalized so that all values are based on production from 100 pounds of dry composite waste pulp. In both tests the quantity of ash in the product closely matches the quantity of ash in the feed.

TABLE 5

QUANTITY AND ENERGY CONTENT OF PRODUCTS FROM COMPOSITE WASTE PULP (NORMALIZED TO 100 lbs OF DRY FEED)

| Run Temperature, °F. | 800 | 600 |
|---|---|---|
| Weight (lb) | | |

TABLE 5-continued
QUANTITY AND ENERGY CONTENT OF PRODUCTS
FROM COMPOSITE WASTE PULP
(NORMALIZED TO 100 lbs OF DRY FEED)

| | | |
|---|---|---|
| Wet Feed | 463 | 463 |
| Dry Feed | 100 | 100 |
| Solid Product | 13.50 | 37.50 |
| Tar Product | 10.80 | 0.90 |
| Gas Product | 26.20 | Not measured |
| Water and Loss | 49.85 | Not measured |
| Energy Content of Products (BTU) | | |
| Solid | 143,335 | 486,480 |
| Tar | 162,200 | 11,000* |
| Gas | 32,200 | 0* |

*Estimated.

In summary, the higher temperature run (800° F.) produced a high ash content solid product, a low ash content tar product and a low heating value gas. The lower temperature run (600° F.) produced a high heating value solid product with a fuel value of 25.9 million BTU per ton of fuel, and a yield of 37.5%. The lower temperature operation was more efficient as determined by the total heating value in the product.

Adding the contribution of the tar at approximately 22 million BTU per ton of tar, the total fuel value for the low temperature process was approximately 26.5 million BTU per ton of fuel. The 10.72% by weight ash content is lower than that reported for many fuel grade coals, and is compatible with ash levels for production of coal-oil or coal water mixtures. The 1.42% by weight moisture content is much lower than the moisture content of most coals, and the fuel product will not reabsorb any moisture. The 0.16% by weight sulfur is well within acceptable limits for meeting low-sulfur fuel criteria.

Although this invention has been described with reference to its preferred embodiment, other embodiments can achieve the same results. Variations and modifications of the present invention will be obvious to those skilled in the art and it is intended to cover in the appended claims all such modifications and equivalents as follow in the true spirit and scope of this invention.

I claim:

1. A method for processing waste into a chemical intermediate substrate for production of energy sources and non-energy related by-products comprising:
   (1) producing a slurry of organic and inorganic materials by pulping;
   (2) separating the organic and inorganic materials shredded in step 1 by centrifuging out remaining inorganic components in the slurry of step (1) to produce a predominately organic slurry;
   (3) demineralizing and detoxifying the organic slurry of step (2); and
   (4) forming a chemical intermediate substrate by stabilizing, dewatering, and storing the demineralized organic material of step (3).

2. The method of claim 1 further comprising:
   (5) equalization and optimization of the net available energy content of said chemical intermediate substrate by providing means for:
      (a) storage and mixing of large quantities of the chemical intermediate substrate;
      (b) sampling an analysis of the chemical composition of the chemical intermediate substrate; and
      (c) adjustment of the chemical composition of the chemical intermediate substrate to a chemical content distribution of preferred energy by addition of appropriate components on a selective basis.

3. The method of claim 2 further comprising:
   the production of a solid carbon fuel by destructive distillation of said chemical intermediate substrate of step (5) in a sealed, oxygen free, high pressure, high temperature reaction vessel.

4. The method of claim 2 further comprising the production of steam by the direct combustion of said chemical intermediate substrate of step (5) in a combination combustion chamber and boiler.

5. The method of claim 4 further comprising generating electricity using a steam driven turbine.

6. The method of claim 2 further comprising generating and collecting a methane containing gas from a mixture comprising said chemical intermediate substrate from step (5), nutrients, microbial innoculum, and buffer in a landfill area covered by an impermeable barrier.

7. The method of claim 1 further comprising the formation of cement board by compression of a mixture of cement and said chemical intermediate substrate from step (4).

8. The method of claim 1 further comprising the formation of fiber board by mixing gypsum and fiberized glass recovered in step (2) of claim 1.

9. The method of claim 1 further comprising enzymatic and mechanical degradation of cellular material in said organic slurry separated in step (2) of claim 1.

10. The method of claim 1 wherein said waste is selected from at least one of the group consisting of sewage sludge, municipal solid waste, and industrial solid waste.

11. The method of claim 1 wherein said demineralizing step comprises mixing a chelating agent with said organic slurry.

12. The method of claim 1 wherein said metal and glass components of step (3) are separated by magnetic means.

13. The method of claim 1 wherein the slurry producing step further comprises:
   shredding the organic and inorganic waste materials.

* * * * *